United States Patent [19]
Rittman et al.

[11] Patent Number: 5,756,406
[45] Date of Patent: May 26, 1998

[54] METHOD OF MAKING A SOFT TRIM COMPOSITE, AND IMPROVED SOFT TRIM COMPOSITE

[75] Inventors: Jay Rittman, Port Huron; Michael W. Pedrotti, Marysville, both of Mich.

[73] Assignee: Blue Water Plastics, Inc., Marysville, Mich.

[21] Appl. No.: 346,747

[22] Filed: Nov. 30, 1994

[51] Int. Cl.$^6$ ............................................... B32B 31/06
[52] U.S. Cl. .................. 442/117; 442/136; 442/149; 442/394; 442/398
[58] Field of Search .................... 428/224, 304.4, 428/306.6; 297/DIG. 1; 442/117, 136, 149, 394, 398; 156/148, 219, 220, 242

[56] References Cited

U.S. PATENT DOCUMENTS

| | | | |
|---|---|---|---|
| 3,873,654 | 3/1975 | Smith | 264/46.4 A |
| 4,125,490 | 11/1978 | Hettinga | 521/51 |
| 4,270,964 | 6/1981 | Flaskett | 156/228 |
| 4,285,901 | 8/1981 | Yotsutsuji et al. | 264/225 |
| 4,307,057 | 12/1981 | Hettinga | 264/328.8 |
| 4,323,406 | 4/1982 | Morello | 156/91 |
| 4,381,764 | 5/1983 | Wojcik | 126/426 |
| 4,389,438 | 6/1983 | Ohtsuki et al. | 428/35 |
| 4,397,806 | 8/1983 | Hettinga | 264/324.14 |
| 4,421,827 | 12/1983 | Phillips | 428/418 |
| 4,432,822 | 2/1984 | Adams et al. | 156/148 |
| 4,445,954 | 5/1984 | Adams et al. | 156/148 |
| 4,471,020 | 9/1984 | McCarthy | 428/309.9 |
| 4,613,475 | 9/1986 | Hettinga | 264/328.1 |
| 4,743,323 | 5/1988 | Hettinga | 156/160 |
| 4,769,274 | 9/1988 | Tellvik et al. | 428/218 |
| 4,910,067 | 3/1990 | O'Neill | 428/139 |
| 4,936,936 | 6/1990 | Rohrbacher | 156/239 |
| 4,997,707 | 3/1991 | Otawa et al. | 428/319.3 |
| 5,110,532 | 5/1992 | Hettinga | 264/257 |
| 5,139,714 | 8/1992 | Hettinga | 264/45.1 |
| 5,151,237 | 9/1992 | Hettinga | 264/257 |
| 5,186,777 | 2/1993 | Perenon et al. | 156/79 |
| 5,196,151 | 3/1993 | Sakaida et al. | 264/46.7 |
| 5,275,764 | 1/1994 | Hettinga | 264/1.9 |

*Primary Examiner*—Richard Weisberger
*Attorney, Agent, or Firm*—M. Michael Hamburg

[57] ABSTRACT

A method for making a soft trim composite, and a resulting improved soft trim composite, used for example as a motor vehicle interior trim component or a seat covering component, comprises laminating a surface covering onto an expanded cellular layer, where a cellular layer is provided, to form a bilaminate, and placing a heat barrier insert, comprising nonwoven fibers coated on one side with thermoplastic resin in a mold between the bilaminate and a substrate created in a molding step. The heat barrier insert dissipates heat from substrate molding, permitting a substantially uniform and complete bonded relation to be achieved between substrate and insert, as well as between insert and bilaminate, virtually simultaneously with creation of the substrate, and without causing substantial damage to the bilaminate. An improved soft trim composite made by the method described, is also provided.

17 Claims, 3 Drawing Sheets

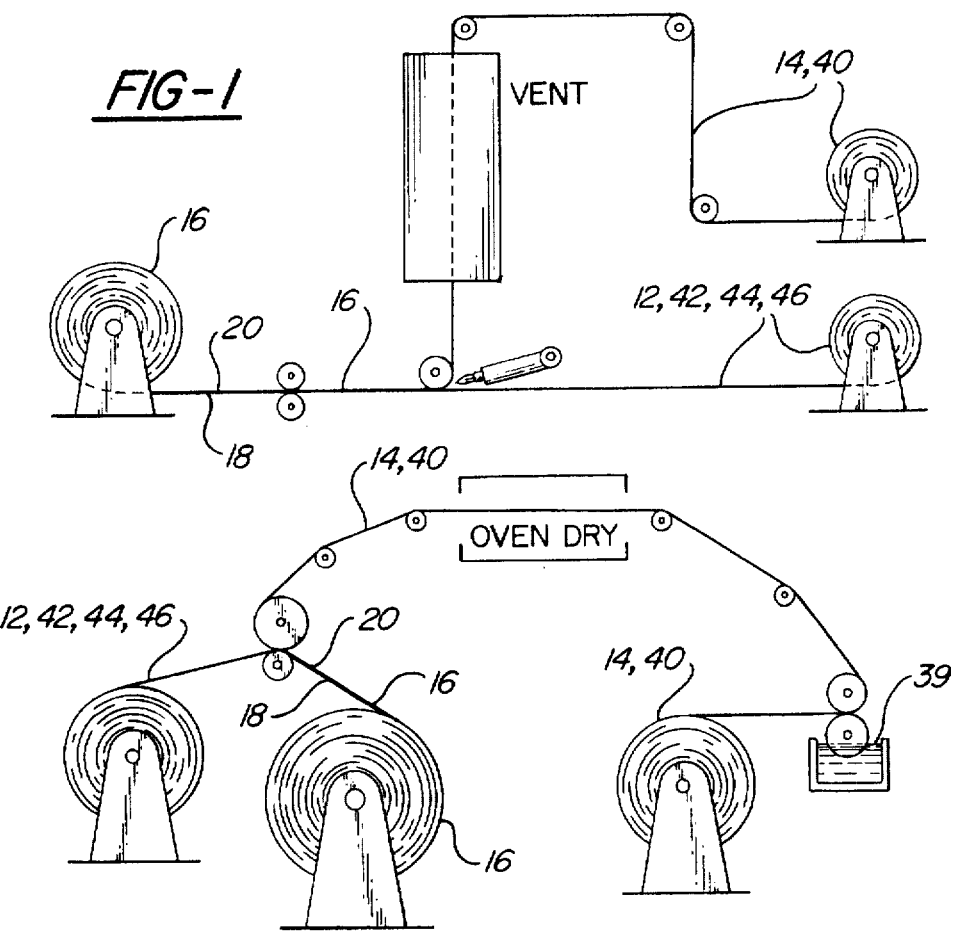
FIG-1
FIG-2
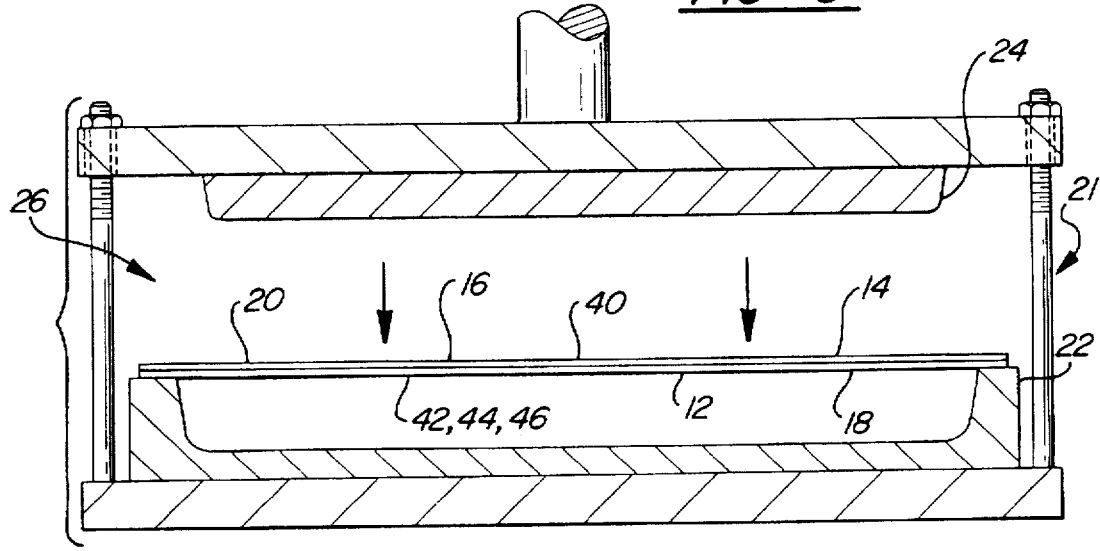
FIG-3

METHOD OF MAKING A SOFT TRIM COMPOSITE, AND IMPROVED SOFT TRIM COMPOSITE

BACKGROUND OF THE INVENTION

This invention relates to a new method for making a soft trim composite, such as a trim or seating composite, as well as an improved soft trim composite, involving an improved combination and bonding of certain materials and controlling of heat during bonding operations.

More specifically, this invention describes a new and improved method for bonding layers of thermoplastic and expanded cellular materials, as well as thermoplastic and surface covering materials, in order to make a soft trim composite such as an automotive or truck interior trim panel, package tray, or a component of a seating device, that overcomes difficulties in bonding of such thermoplastic materials to cellular and surface covering materials, and uses injection molding and similar techniques to create such bonds without damaging the layers of the composite through excessive heat and pressure; and the invention further describes an improved soft trim composite formed by the method described.

A variety of techniques have been used or proposed for use to create soft trim composites useful in structural or decorative panels, such as automotive or truck interior trim panels, seat back and other seating device panels, package trays and the like. It is an important consideration to the manufacture and use of such composites that the individual layers comprising the composite are combined in a manner that provides a substantially uniform and completely bonded relationship between them. Furthermore, this bonded relationship should be created so that none of the components, or any appearance surfaces of the components, are significantly marred, damaged or deformed by the manufacturing process. Where bonding occurs by molding processes, this is not necessarily easy to achieve.

In making composites that are used as interior trim or seating device panels or for similar purposes, difficulty also frequently arises in obtaining appropriate bonds between components. This is particularly true where at least one of the materials to be bonded comprises a thermoplastic material. For example, polypropylene and polyethylene are resistant or virtually impervious to many chemical agents which one would normally use to enable bonding of such materials to other components.

Agents which may be strong enough or of a chemical composition which will adequately attack (by wetting) an exterior surface of a polyolefin or other thermoplastic to enable bonding also frequently include or release toxic or environmentally unsafe hazardous materials, making use of such agents undesirable or unacceptable.

Some agents are used to act as adhesives that are activated by such techniques as applying heat and/or pressure, rather than simply to wet a surface to increase susceptibility to bonding. Use of adhesives increases cost and adds a manufacturing step. Typical adhesives used for this purpose frequently do not work well with the polyolefin family of materials, including polypropylene and polyethylene, unless the adhesive is strong enough that it displays the toxic or hazardous material characteristics discussed above. Thus, adhesives are not a desirable solution to these problems, and in fact often add to the difficulties.

Bonding problems are particularly prevalent where one of the components comprises an expanded cellular layer, such as polypropylene or polyethylene foam. Where a surface covering for a composite is to have a desired outer appearance surface, that covering must not be distorted or damaged as may occur in molding operations through, for example, warpage, dimpling, wrinkling, shrinking, melting or burn through of the covering or a cellular layer underlying the covering. Where a cellular layer is subjected to excessive heat, consequent shrinkage, warpage or melting of the cellular layer will, for example, cause unacceptable surface covering appearance defects as described above. Similar problems occur where no cellular layer is used. The surface covering may be bonded to a foam layer outside a mold to avoid excessive heat or pressure of any subsequent manufacturing steps, such as injection molding, extrusion and compression molding. Such bonds may be created by flame laminating or gluing the layers together to form a bilaminate to which additional layers may be added to form the desired composite.

It has been, however, extremely difficult if not, infeasible, to bond bilaminates comprising foam backed appearance surfaces to a substrate for use as trim panels or seating components, without creating a substantially rigid substrate prior to conducting bonding operations for connecting the substrate to the foam layer. (The same difficulties occur where foam is deleted and the surface covering is bonded to the substrate.) This is particularly true with polypropylene substrates, where injection molding is the technique selected for forming the substrate. In attempting to create a composite which combines a bilaminate (comprising flame laminated or glued foam layer and surface covering) with an injection molded substrate, the heat and pressure of the injection molding operation has, prior to the present invention, been virtually certain to damage or destroy the integrity of the resulting composite—the foam and/or the surface covering are found to have melted, warped, wrinkled, dimpled, burned or otherwise incurred structural or appearance alterations making the composite useless for its application. The same adverse result may be anticipated where the foam layer is eliminated, or where the substrate is formed by similar techniques such as extrusion followed by compression molding (with or without a foam layer).

It is preferred to make the composite by the virtually simultaneous molding and bonding of the substrate with the cellular layer because thermoplastic substrates, particularly those comprised of polypropylene resin, exhibit significant resistance to bonding to other materials, even those compatible in chemical composition. If a bonded composite may be completed with the molding operation, the need to separately bond a bilaminate to a previously created, bond resistant substrate may be avoided.

Attempts to make a composite as described above with a substrate virtually simultaneously created by injection molding (or extrusion/compression molding) of thermoplastic resin, which is bonded to a cellular portion of a bilaminate (or directly to a surface covering) have, however, met with almost uniform lack of success due to the likelihood of damage as described above.

It can be seen, therefore, that solving the problem with making a soft trim composite which involves virtually simultaneous molding of a substrate and bonding that substrate to a cellular portion of a bilaminate without the addition of a separate adhesive requires controlling the heat (and sometimes pressure) to which the components of the composite are exposed. To properly make the composite, any application of heat should be controlled and dissipated to cause substantially complete and uniform bonding to occur while avoiding any significant damage to the components of the composite. Relatively low fill pressures in a molding device and relatively low clamping pressures for maintaining the mold in a closed position are also beneficial in solving the above problems for the same reasons.

Thus, it can be seen that a need exists for a manufacturing approach which will provide a substantially uniform and complete bond between components, avoid the problems described above, and yet prove efficient and cost effective. It is therefore, an object of the present invention to substantially eliminate the use of adhesives in bonding a thermoplastic substrate with a bilaminate which may alternatively comprise a cellular layer in combination with a surface covering of desired appearance or a surface covering without the cellular layer, thereby typically avoiding an extra manufacturing step and reducing the cost and risk of exposure to potentially hazardous or toxic emissions from such adhesives.

It is a further object of the present invention to provide an improved method of bonding thermoplastic substrates, and particularly polypropylene substrates, to cellular or surface covering layers essentially simultaneously with creation of such a substrate through injection molding or through extrusion and compression molding, while reducing or substantially eliminating damage to the components being bonded.

Yet another object is to minimize the potential waste, damage and destruction of composite components being bonded that is caused by uncontrolled application of heat, and/or use of relatively high fill pressure and clamping pressure in creating the composite in a mold or similar bonding device.

It is yet another object of the present invention to provide an improved method for making a composite permitting substantially uniform and complete bonding of a thermoplastic substrate to a cellular layer or surface covering of a bilaminate, which advantageously minimizes heat and pressure induced damage such as warping, wrinkling, shrinking, melting, burn through and dimpling of composite components.

A further object of the present invention is to provide an improved soft trim composite used, for example, as a motor vehicle interior trim component or a seat covering component which improves the bonding capability of a thermoplastic substrate to a cellular layer or surface covering layer of a bilaminate through use of an improved heat barrier insert and selectively controlled fill pressure and clamping pressure in molding of the composite, while avoiding substantial damage to the surface covering and cellular layer in molding operations.

SUMMARY OF THE INVENTION

The present invention presents a solution to the problems described above. The objects, benefits and advantages of the present invention are achieved by providing an improved method for making a bonded soft trim composite, as well as an improved soft trim composite, used, for example, as a motor vehicle interior trim component or a seat covering component, each involving creation of a bilaminate, and virtually simultaneous molding of a substantially rigid thermoplastic substrate and bonding of the substrate to the bilaminate through the use of a heat barrier insert positioned between the substrate and bilaminate, and the controlling of heat and (optionally) pressure in the molding process so the incidence of warpage, wrinkling, shrinkage, dimpling, melting, burn through and other types of damage to any portion of the bilaminate are substantially reduced or avoided.

In accordance with a method aspect of the present invention, a surface covering is provided, which is optionally laminated onto an expanded cellular layer to form a bilaminate which is then placed in a mold, followed by adding of thermoplastic resin into the mold to form a substrate with a heat barrier insert interposed between the bilaminate and the substrate to dissipate excessive heat in the molding process while enabling a substantially uniform and complete bonded relation to be achieved between the molded substrate and the bilaminate, without causing significant warpage, wrinkling, shrinkage, dimpling, melting, burn through or other substantial damage to the bilaminate.

In accordance with a soft trim composite aspect of the present invention, a bilaminate is provided, comprising a surface covering optionally laminated onto an expanded cellular layer, and a molded substrate is bonded to the bilaminate with a heat barrier insert interposed between the bilaminate and substrate, thereby permitting a substantially complete and uniform bonded relation to be achieved between the substrate and bilaminate without use of separate adhesives or manufacturing steps, and without incurring significant damage as described above to the cellular layer or the surface covering, thus producing the desired appearance for the soft trim composite to be used as, for example, a motor vehicle interior trim component or a seat covering component.

BRIEF DESCRIPTION OF THE DRAWINGS

Other objects, features and advantages of the present invention will become apparent after reference to the following detailed description and drawings, wherein:

FIG. 1 is a semi-schematic front view of a typical flame laminating operation to laminate a surface covering onto an expanded cellular layer, thus forming a bilaminate;

FIG. 2 is a semi-schematic front view of a typical gluing operation to laminate a surface covering onto an expanded cellular layer, thus forming a bilaminate;

FIG. 3 is a cutaway, top cross sectional view of a typical mold for molding a substrate, bonding the substrate to a heat barrier insert and the insert to a bilaminate, showing the position and orientation of the bilaminate in the mold;

DETAILED DESCRIPTION OF THE PREFERRED EMBODIMENTS

Figure 4:
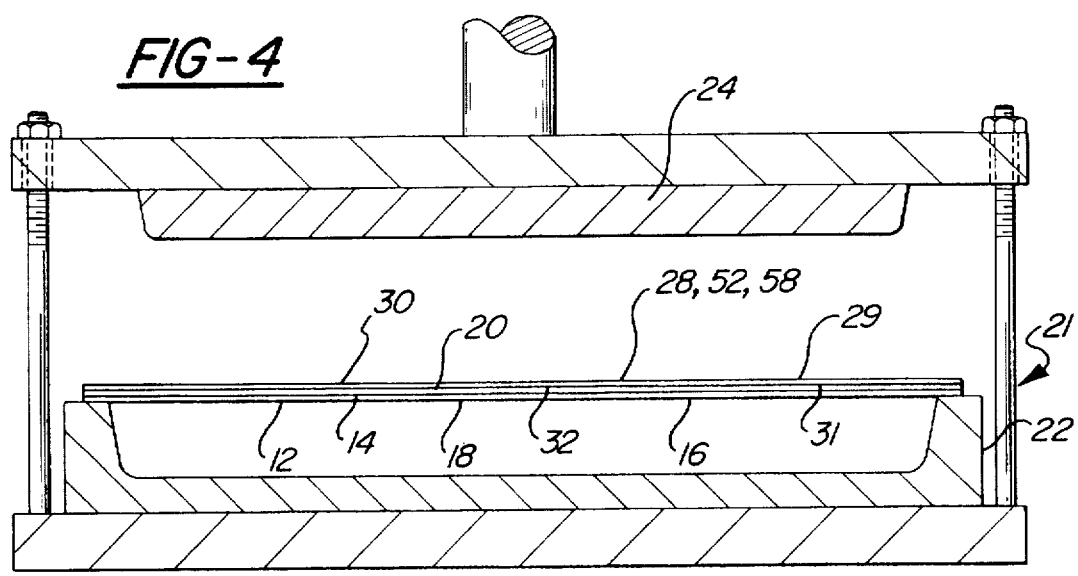
FIG. 4 is a cutaway, top cross sectional view of the embodiment in FIG. 3, showing a heat barrier insert positioned and oriented in the mold with respect to the bilaminate.

Referring now in detail to the drawings, a typical method for making a soft trim composite 10 (shown in FIG. 5) in accordance with the present invention is illustrated in FIGS. 1–5. As shown, a method of making a soft trim composite 10 used, for example, as a motor vehicle interior trim component or a seat covering component is provided by the following steps.

Referring now to FIGS. 1 and 2, in one preferred embodiment, a surface covering 12 is provided for laminating onto an expanded cellular layer 14 to form a bilaminate 16, having an appearance surface 18 defined by an outer contour of the covering, and a cellular surface 20 defined by an outer contour of the cellular layer 14. While the bilaminate 16 may provide a soft touch characteristic in the feel of the surface covering 12 or of the bilaminate 16 because of the presence of a cellular layer 14, some embodiments are not intended to provide a soft touch characteristic, but are still referred to as soft trim composites 10.

Once the bilaminate 16 is made, the next step is taken by placing the bilaminate 16 in a mold 21 having a first piece 22 and a second piece 24 in opposing relation to each other to define a mold cavity 26, whereby the appearance surface 18 is in contact with the first piece 22. FIG. 3 is illustrative.

Figure 6:
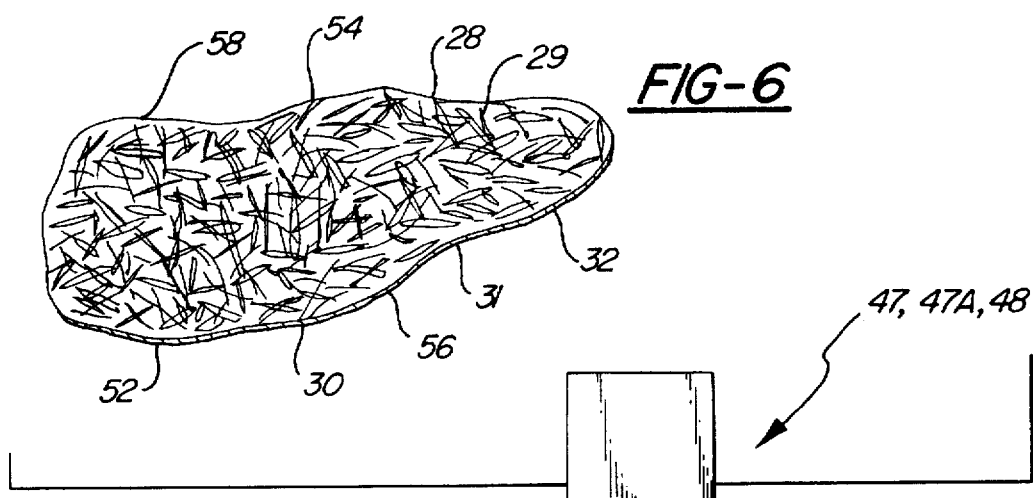
FIG. 6 is a partial perspective view of a heat barrier insert showing fibers comprising a fiber side, and a thermoplastic film coating comprising a film side.

A heat barrier insert 28, including nonwoven fibers 29 comprising a fiber side 30 and a thermoplastic resin coating 31 comprising an opposing film side 32 is used to dissipate the heat generated by molding operations in order to protect the integrity of the bilaminate 16, and yet permit substantially uniform and complete bonding of the composite 10 layers without causing significant damage such as warpage, wrinkling, shrinkage, dimpling, melting or burn through of the surface covering 12 or cellular layer 14. As shown in FIG. 4, this is done by placing the heat barrier insert 28 in the mold 21 wherein the insert 28 is positioned against said bilaminate cellular surface 20 with the film side 32 facing, and substantially covering, the cellular surface 20. The nonwoven fibers 29 are to have a melting point above the melting point of the thermoplastic resin coating 31, and the cellular layer 14. In any embodiment where the cellular layer 14 may be omitted, the nonwoven fiber 29 melting point will also be above the melting point of the surface covering 12. FIG. 6 illustrates the heat barrier insert 28.

Placement of the insert 28 is followed by closing of the mold 21, and adding of molten thermoplastic resin 34 to fill the mold cavity 26. The order of these two steps may vary depending upon the embodiment. See FIG. 5.

Referring again to FIG. 5, cooling of the thermoplastic resin 34 subsequently creates a substantially rigid thermoplastic substrate 36 wherein a substantially complete and uniform bonded relation is achieved at an interface 38 between the substrate 36 and said insert 28, as well as between the substrate 36 and the cellular layer 14. This is done without causing significant damage to one or more of the surface covering 12 and the cellular layer 14. The molding of the substrate 36 enables the bonded relations described above to be created on a substantially simultaneous basis with each other, and with the creation of the substrate 36. The nonwoven fibers 29 are to have a melting point above the substrate 36 melting point. Separate steps from creation of the substrate 36 and the need for adhesive additives for creating such bonded relations are substantially eliminated. It is preferred that compatible materials be used for the components to be bonded, as it improves the capability to achieve a proper bond, although some bonding is possible with materials that may not be considered compatible in chemical composition. An example of compatible materials would be using an olefin material for the insert film side 32 and each of the substrate 36 and cellular layer 14.

Laminating of the surface covering 12 onto the cellular layer 14 may be conducted by any conventional techniques, including one of flame laminating, as shown in FIG. 1, and gluing of the surface covering 12 to the cellular layer 14 as shown in FIG. 2. As in FIG. 2, glue 39 is added to the cellular layer 14 in that embodiment.

In one alternative preferred embodiment, the cellular layer 14 comprises an expanded foam layer 40. A foam layer 40 is particularly susceptible to damage during injection molding or compression molding of a substrate 36, but it is desirable to use due to its soft touch characteristics.

In any embodiment, the surface covering 12 may be selected from the group consisting of a vinyl covering 42, fabric covering 44 and leather covering 46. These surface coverings 12 may be utilized regardless of the type of cellular layer 14 selected, or even with the cellular layer 14 omitted.

Figure 5:
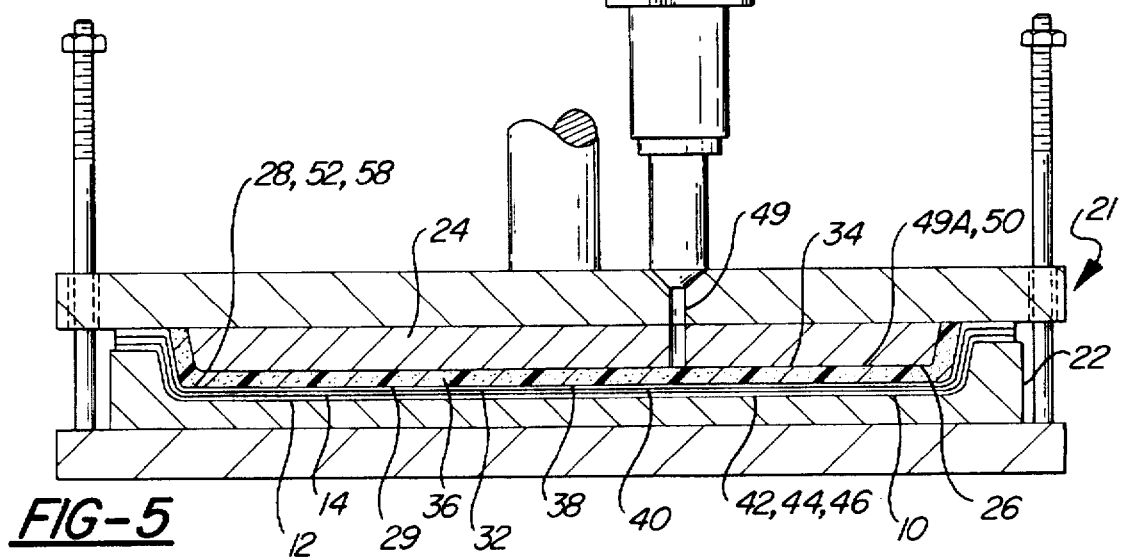
FIG. 5 is a cutaway, top cross sectional view of the embodiment in FIG. 4, showing the mold in a closed position, thermoplastic resin added into the mold through an injection molding machine, and the completed composite following cooling.

In addition, the adding of molten thermoplastic resin 34 to the mold 21 may be done by any conventional technique. One preferred technique is injecting the resin 34 into the mold 21 with an injection molding machine 47, as illustrated in FIG. 5. This injection molding machine may comprise a high pressure injection molding machine 47A or a low pressure injection molding machine 48. Use of a low pressure injection molding machine 48 is preferred for injection of thermoplastic resin 34 to be conducted, with which the mold 21 is then adapted to be operable. This preference is, in part, due to the enhanced control available over the injecting operation and the molding of the composite, as is further discussed below.

Use of the heat barrier insert 28 greatly assists in dissipating heat from the molding process to permit appropriate bonding without significant damage to the composite 10 components. The insert 28, in large part, is believed to enable bonding of the composite 10 to occur without the occurrence of significant damage of the types previously described. Without limitation as to any other theories of operation, it is believed that the bonding is enabled through at least partial melting of the insert thermoplastic resin coating 31 and wetting of the bilaminate cellular surface 14 during substrate molding, and coating 31 correspondingly bonding to the substrate (as may the fibers 29 as well) and the cellular layer 14. The fibers 29 are believed to not significantly melt in the molding operation.

As heat is not, however, the sole source of potential damage to the composite 10, a preferred method embodiment also contemplates utilizing controlled addition of molten thermoplastic resin 34 into the mold 21 and relatively low clamping pressure (tonnage) for retaining the mold 21 in a closed position during molding operations, in order to maximize the likelihood of achieving appropriate bonding without significant damage to the composite 10. Excessive fill pressures may alone damage the composite 10. Thus, in one alternative embodiment of a method for making a soft trim composite 10, it is preferred the adding of molten thermoplastic resin 34 be controlled to produce relatively low fill pressures of resin 34 in the mold cavity 26, and thus allow relatively low clamping pressure.

While conventional molds 21 and injection molding machines 47 for injection molding of thermoplastic resin 34 should properly be controllable to achieve the relatively low fill pressures and clamping pressures desired in a preferred embodiment of the present invention, it is more preferred to use a low pressure injection molding machine 48. One example of this preferred type of machine is a Hettinga low pressure injection molding machine available from Hettinga Equipment, Inc. of Des Moines, Iowa. Injection molding machines are often rated based upon maximum shot size with overlapping capabilities, and thus a variety of machines may be operable for the present invention. Although others would work, one Hettinga machine preferred for the embodiments of the present invention is the 4.75 kilo injection unit with a 644 ton station.

The advantages of a low pressure injection molding machine 48 as to the present invention are believed to include:

1. The ability to select a reduced clamping tonnage for holding the mold 21 in a closed position. A typical low pressure machine 48 might have a range of about 64.4 tons to 644 tons. A conventional relatively high pressure injection molding machine 47A, such as a 700 ton unit, might permit about 300 tons minimum clamping pressure. The inability to use lower clamping pressures simply limits flexibility in composite 10 manufacture. It is preferred the clamping pressure be about 64.4 to 120 tons.

2. Use of relatively low clamping pressure permits the mold 21 to be filled with relatively low fill pressure, permitting improved control of the flow and greater uniformity of composite 10 components and dimensions. That translates into more consistent, uniform and complete bonding of composite 10 components in the mold 21.

3. It is possible to control the injection to obtain more precise shot size.

4. It is possible to control temperatures of the resin 34 to obtain a more uniform melt of resin 34 as it enters the mold 21; and by controlling temperature, viscosity is also controlled so the flow rate control is enhanced. In this manner, the necessity and possibility of overfill of the mold 21 in order to ensure complete and defect free molding of components (which may occur with conventional high pressure injection molding machines 47A) and resulting excessive pressure and consequent damage to the insert 28 and bilaminate 16 are minimized or substantially eliminated.

5. The low pressure molding conditions described above (particularly low clamping pressure) also permit the mold 21 to partially open during injecting of resin 34. This is a temporary condition, which may be controlled, and reversed to fully close the mold 21 by lowering hydraulic fill pressure imparted to the resin 34 being injected into the mold 21 near the end of the resin 34 injection. The step of injecting resin 34 may thus be considered to be achieved by either applying continuous, constant fill pressure to the resin 34 with any injection molding machine 47, or using a "profiled" pressure involving a controlled variation of fill pressure levels, and thus enhanced control over pressures placed on composite 10 layers, and dimensions and quality of resulting molded composites 10.

6. The mold 21 may be adapted to permit injecting of resin 34 through a plurality of gates 49 that are controllable by use of hydraulic valves which may open and close in sequence during injection operations. This is believed to be advantageous because of enhancing control over pressures in the mold 21 and improved flexibility to produce composite 10 components with proper dimensions and bonding.

In further alternative preferred method embodiments, the thermoplastic resin 34 may comprise any polyolefin 49A, such as polypropylene 50, and the cellular layer 14 may comprise expanded foam such as using polypropylene. While the resin 34 and cellular layer 14 may each generally comprise any thermoplastic material, some additional examples of possible alternative embodiments include polyurethane, polyester, polyethylene, polypropylene, other polyolefins and ABS. Polyolefins are preferred.

In addition, the heat barrier insert 28 may comprise certain alternative embodiments. For example, the fibers 29 may alternatively comprise any thermoplastic material, such as nylon, polyester or polyolefins. One preferred embodiment on insert 28 comprises a spunbonded nonwoven polyester fabric 52, having polyester fibers 54 coated on one side with polypropylene resin 56. Even more preferred as an alternative embodiment for the heat barrier insert 28 is a Freudenburg Spunweb Co. (Durham, N.C.) product identified as Reusable Release Liner White (Onion Skin), PTLD-724-White 58. Some selected characteristics of this Freudenburg product follow:

Nominal weight (density): 50 grams/square meter
Thickness of polypropylene resin coating: 0.064 mm
Total weight (density): 80–100 grams/square meter
Thickness: 0.10–0.30 mm While other fiber nominal weights (densities) may work for purposes of the present invention, it is preferred to be less than about 80 grams/square meter, regardless of insert 28 embodiment utilized.

While injection molding is preferred, it should be understood that other molding techniques which permit the formation of a soft trim composite 10 through adding of resin 34 to the mold 21 for substantially simultaneous formation of a substrate 36 with bonding of that substrate 36 to the bilaminate 16 while avoiding significant damage due to heat or pressure will also work to produce an acceptable composite 10.

Figure 7:
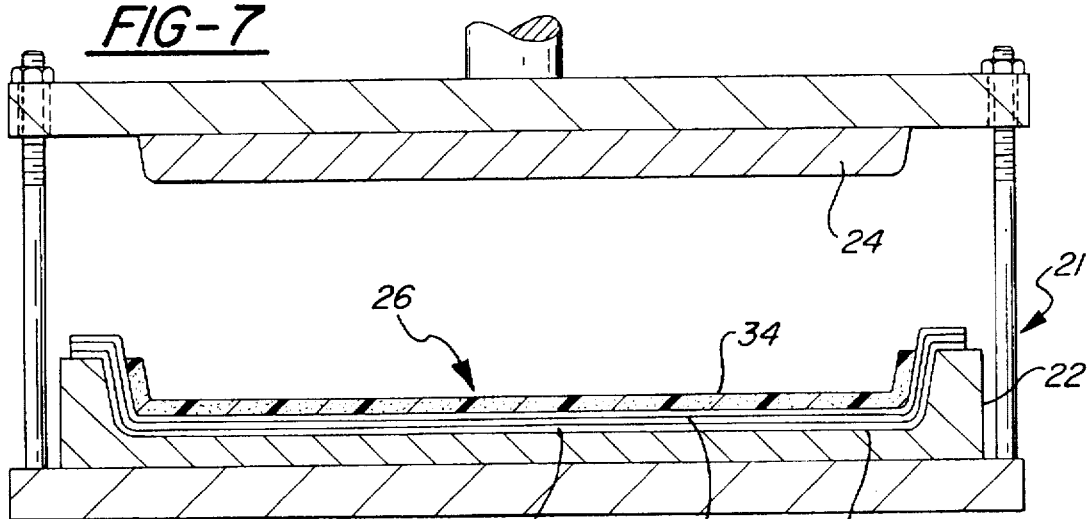
FIG. 7 is a cutaway, top cross sectional view of a typical mold for molding a substrate using compression molding, showing thermoplastic resin extruded onto a bilaminate.
Figure 8:
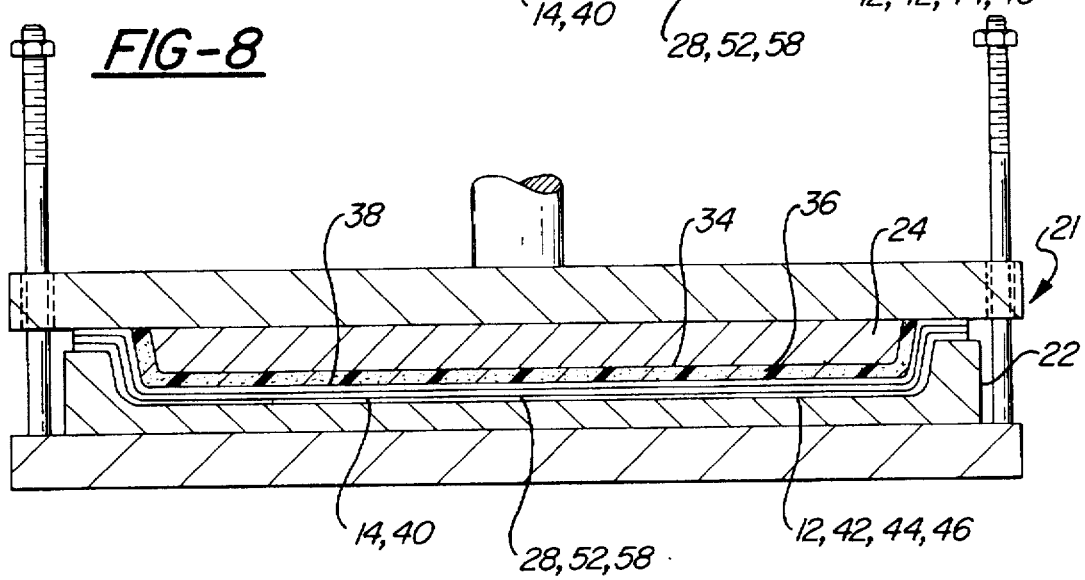
FIG. 8 is a cutaway, top cross sectional view of the embodiment shown in FIG. 7, showing the mold in a closed position for compression molding.

One alternate molding technique in accordance with a method aspect of the present invention utilizes extrusion in combination with compression molding. As illustrated in FIG. 7, a method aspect of making a composite 10 is shown, wherein adding the thermoplastic resin 34 is accomplished by extruding molten thermoplastic resin 34 onto the heat barrier insert 28 prior to the step of closing the mold 21. The step of closing the mold, shown in FIG. 8, then comprises compression molding the extruded thermoplastic resin 34 to form a substrate 36 of desired shape.

Figure 9:
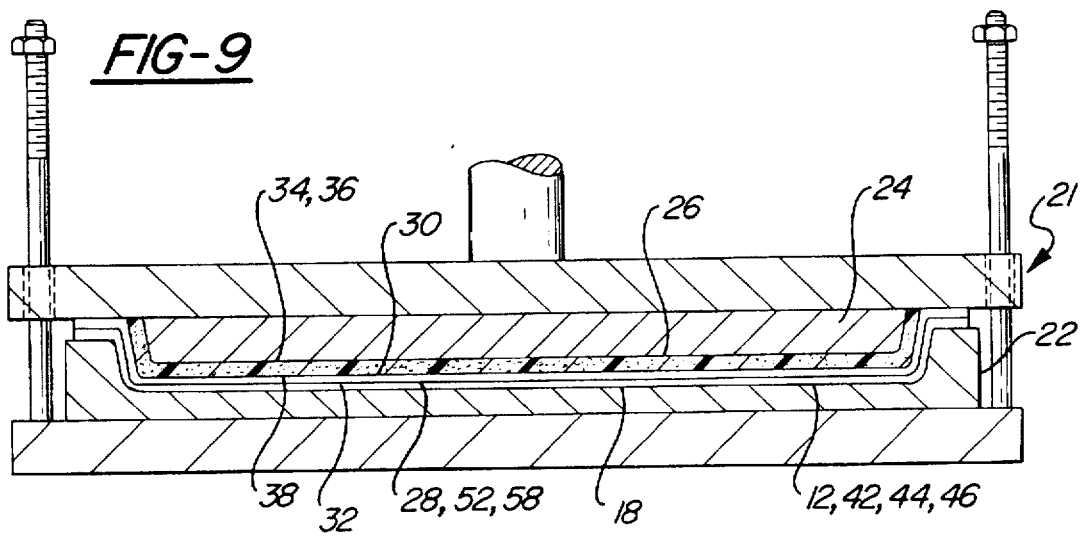
FIG. 9 is a cutaway, top cross sectional view of the embodiment shown in FIG. 5, showing the molding of a composite which omits an expanded cellular layer from the bilaminate.

In one embodiment of a method aspect of the present invention, a composite 10 is to be created without use of a cellular layer 14, which is omitted. As illustrated in FIGS. 5 and 9, said method comprises providing a surface covering 12 having an appearance surface 18 defined by an outer contour of the surface covering. Preparation for molding occurs in placing the surface covering 12 in a mold 21 having a first piece 22 and a second piece 24 in opposing relation to each other to define a mold cavity 26, wherein the appearance surface 18 is in contact with the first piece 22. Placing of a heat barrier insert 28 in the mold 21 then occurs, such insert 28 having a fiber side 30 and a film side 32 in opposing relation to each other, wherein the film side 32 is in contact with and substantially covers the surface covering 12.

Upon closing the mold 21, and adding molten thermoplastic resin 34 to the mold cavity 26, cooling of the resin 34 occurs to create a substantially rigid thermoplastic substrate 36 wherein a substantially complete and bonded relation is achieved at an interface 38 between the substrate 36 and the insert 28, as well as between the insert 28 and the surface covering 12, without causing significant damage to the surface covering 12.

Any of the alternative embodiments of the methods of making a composite 10 previously described, including, but not limited to, alternate compositions of materials, or techniques for combining them, are equally applicable to this and other described method embodiments, and to the composite 10 embodiments described below.

A further alternative preferred embodiment of a method aspect of the present invention involves using molten thermoplastic resin 34 comprising ABS. In this embodiment, a bilaminate 16 is created, and laminating is conducted by one of flame laminating and gluing the surface covering 12 to the cellular layer 14. Adding of molten thermoplastic resin 34 is conducted by injecting resin 34 into the mold with an injection molding machine 47. The heat barrier insert 28 comprises nonwoven fibers 29 comprising a fiber side 30 and thermoplastic resin coating 31 comprising an opposing film side 32, wherein the nonwoven fibers have a melting point above the melting point of the thermoplastic resin coating 31, the cellular layer 14, and a substrate 36 to be bonded to the insert 28. As in other embodiments, the insert 28 is positioned against the bilaminate cellular surface 20 with the film side 32 facing the cellular surface 20. Although ABS and olefins are not the most compatible of materials for bonding, the cellular layer 14 may be a polyolefin foam layer or ABS foam layer, any of the previously described surface coverings 12 and resin coatings 31 may be used, and the insert fibers 29 may comprise any embodiment with a melting point temperature above that of the substrate 36, cellular layer 14 and resin coating 31 used.

Referring now to FIG. 3 and 4, an improved composite 10 will be described, which may be made by the advantageous method embodiments described above.

As shown in FIG. 1 and 2, a surface covering 12 is provided, and an expanded cellular layer 14 is laminated to that surface covering 12, thus forming a bilaminate 16, having a surface 18 defined by an outer contour of the surface covering and a cellular surface 20 defined by an outer contour of the cellular layer. As with the method embodiments, the bilaminate 16 may be formed by any conventional bonding techniques, including those of flame laminating or gluing which are illustrated in FIG. 1 and 2, respectively.

A heat barrier insert 28 having a fiber side 30 and a film side 32 in opposing relation to each other is then provided to be molded to the bilaminate 16 such that the cellular surface 20 is in virtually complete contact with the film side 32. As previously described, it is highly desired that the molding of the substrate 36 be conducted so as to virtually simultaneously achieve a substantially complete and uniform bonded relation between the substrate 36 and the insert 28, as well as between the insert 28 and the bilaminate 16, such that the insert 28 may help dissipate excessive heat generated in the molding operation, and that the additional step of separately forming a substrate 36 and then bonding to the insert 28 may be avoided. This is because of the expense and inefficiency of additional manufacturing steps and difficulty of bonding a previously created substrate 36 to other thermoplastic products. Once the insert 28 has been positioned in the mold 21 in contact with the bilaminate 16, the mold 21 is closed and thermoplastic resin 34 may be added to the mold cavity 26 and allowed to cool in order to create the substrate 36 in a substantially uniform and completely bonded relationship with both the insert 28 and the bilaminate 16 at its cellular surface 20. The thermoplastic resin 34 thus contacts the fiber side 30 of the insert 28 and at least partially melts the film side 32 in forming this bonded relationship. Trimming may occur as desired.

As described, any of the alternative preferred method and composite 10 embodiments, including, but not limited to, alternative layers of the composite 10 and techniques for combining them into a composite 10 as described in the method embodiments of the present invention may be utilized in any other method embodiment for the creation of a composite 10, or in alternate embodiments for creating a composite 10. In both the method embodiments and the soft trim composite 10 embodiments of the present invention, it is most preferred that the heat barrier insert 28 comprise the spunbonded nonwoven polyester fabric 52 which is marketed by Freudenburg Spunweb Co. as a Reusable Release Liner White (Onion Skin), PTLD-724-White 58, although other inserts 28 as described will produce an acceptable heat dissipation and absorption as a heat sink and a proper resulting composite 10 which achieves the substantially uniform and complete bonded relationship between the layers that is desired without incurring significant damage of the nature described above. In each of the method and composite 10 embodiments, the heat dissipation and absorption through the insert fibers 29 should prevent excessive melting or damage of a cellular layer 14 or surface covering 12, particularly in the area of any gate 49 to the mold 21. Localized shrinking of the cellular layer 14 and other damage as described should accordingly be minimized or avoided, thus reducing or eliminating damage and distortion to the appearance surface 18.

In accordance with a composite 10 aspect of the present invention, a composite 10 may be made which omits use of a cellular layer 20, by any methods described above, and further a composite 10 may be made utilizing any of the alternate substrate 36 and other materials, such as molten ABS resin, by the methods set forth above; and a composite 10 may be made by use of extrusion of thermoplastic resin 34 and compression molding of a substrate 36, in accordance with the methods described.

EXAMPLE 1

In testing performed using the Reusable Release Liner White 58 as the heat barrier insert 28, a polyolefin soft trim composite 10 was created with a polypropylene substrate 36 and a polyolefin foam using a low pressure injection molding machine. A substantially uniform and complete bond was achieved between the substrate 36 and insert 28, as well as between the insert 28 and the bilaminate 16 without incurring any significant damage to the resulting composite 10 or its cellular layer 14 or surface covering 12 due to warpage, dimpling, wrinkling, shrinkage, melting or burn through of the cellular layer 14 or the surface covering 12.

Although only a few embodiments have been described in detail above, those having ordinary skill in the art will certainly understand that many modifications are possible in the preferred embodiment without departing from the teachings thereof. All such modifications are intended to be encompassed within the following claims.

We claim:
1. A soft trim composite, comprising:
   a surface covering;
   an expanded thermoplastic cellular layer laminated to the surface covering to form a bilaminate having an appearance surface defined by an outer contour of the surface covering, and a cellular surface defined by an outer contour of the thermoplastic cellular layer;
   a heat barrier insert including substantially non-melted, nonwoven fibers comprising a fiber side and a thermoplastic resin coating comprising an opposing film side, wherein:

the nonwoven fibers have a melting point above the melting point of the thermoplastic resin coating, the cellular layer and a substrate to be bonded to said insert; and said insert is positioned against said bilaminate cellular surface with the film side facing and substantially covering the cellular surface, the insert being substantially uniformly and completely bonded to the cellular surface;

a substantially rigid thermoplastic substrate formed from polyolefin resin, substantially uniformly and completely bonded to the insert, without incurring significant damage to one or more of the surface covering and the cellular layer.

2. A soft trim composite as recited in claim 1, wherein:

the surface covering is selected from the group consisting of a vinyl covering, fabric covering and leather covering; and the cellular layer comprises an expanded thermoplastic foam layer.

3. A soft trim composite, comprising:

a surface covering;

an expanded thermoplastic cellular layer laminated to the surface covering to form a bilaminate having an appearance surface defined by an outer contour of the surface covering, and a cellular surface defined by an outer contour of the thermoplastic cellular layer;

a heat barrier insert including substantially non-melted, nonwoven fibers comprising a fiber side and a thermoplastic resin coating comprising a film side in opposing relation to each other, which insert comprises a Freudenburg Spunweb Co. product identified as a WHITE, wherein the nonwoven fibers have a melting point above the melting point of the thermoplastic resin coating, the cellular layer and a substrate to be bonded to said insert, and said insert is positioned against said bilaminate cellular surface with the film side facing and substantially covering the cellular surface, the insert being substantially uniformly and completely bonded to the cellular surface;

a substantially rigid thermoplastic substrate formed from polyolefin resin, substantially uniformly and completely bonded to the insert, without incurring significant damage to one or more of the surface covering and the cellular layer.

4. A soft trim composite as recited in claim 3, wherein the expanded cellular layer comprises an expanded thermoplastic foam layer.

5. A soft trim composite as recited in claim 4, wherein the surface covering is selected from the group consisting of a vinyl covering, fabric covering and leather covering.

6. A soft trim composite as recited in claim 5, wherein the thermoplastic substrate comprises polypropylene, and the cellular layer comprises polypropylene foam.

7. A soft trim composite, comprising:

a surface covering;

an expanded thermoplastic cellular layer laminated to the surface covering to form a bilaminate having an appearance surface defined by an outer contour of the surface covering, and a cellular surface defined by an outer contour of the thermoplastic cellular layer;

a heat barrier insert having a fiber side and a film side in opposing relation to each other, which insert includes substantially non-melted, spunbonded nonwoven polyester fibers comprising a fiber side, and a thermoplastic resin coating comprising an opposing film side, wherein the nonwoven fibers have a melting point above the melting point of the thermoplastic resin coating, the cellular layer and a substrate to be bonded to said insert, and said insert is positioned against said bilaminate cellular surface with the film side facing and substantially covering the cellular surface, the insert being substantially uniformly and completely bonded to the cellular surface;

a substantially rigid thermoplastic substrate formed from polyolefin resin, substantially uniformly and completely bonded to the insert, without incurring significant damage to one or more of the surface covering and the cellular layer.

8. A soft trim composite as recited in claim 7, wherein the expanded cellular layer comprises an expanded thermoplastic foam layer.

9. A soft trim composite as recited in claim 8, wherein the surface covering is selected from the group consisting of a vinyl covering, fabric covering and leather covering.

10. A soft trim composite as recited in claim 9, wherein the thermoplastic substrate comprises polypropylene, and the cellular layer comprises polypropylene foam.

11. A soft trim composite, comprising:

a surface covering;

a heat barrier insert which includes substantially non-melted, nonwoven fibers comprising a fiber side, and a thermoplastic resin coating comprising an opposing film side, wherein the fibers have a melting point above the melting point of the thermoplastic resin coating and of a substrate to be bonded to said insert, and wherein said insert is positioned against said surface covering with the film side facing and substantially covering the surface covering, the insert being substantially uniformly and completely bonded to the surface covering; and a substantially rigid thermoplastic substrate formed from polyolefin resin, substantially uniformly and completely bonded to the insert, without incurring significant damage to said surface covering.

12. A soft trim composite as recited in claim 11, wherein the surface covering is selected from the group consisting of a vinyl covering, fabric covering and leather covering.

13. A soft trim composite, comprising:

a surface covering;

an expanded thermoplastic cellular layer laminated to the surface covering to form a bilaminate having an appearance surface defined by an outer contour of the surface covering, and a cellular surface defined by an outer contour of the thermoplastic cellular layer;

a heat barrier insert including substantially non-melted, nonwoven fibers comprising a fiber side and a thermoplastic resin coating comprising an opposing film side, wherein:

the nonwoven fibers have a melting point above the melting point of the thermoplastic resin coating, the cellular layer and a substrate to be bonded to said insert, and said insert is positioned against said bilaminate cellular surface with the film side facing and substantially covering the cellular surface, the insert being substantially uniformly and completely bonded to the cellular surface;

a substantially rigid thermoplastic substrate substantially uniformly and completely bonded to the insert, the substrate created by molding of molten ABS resin substantially simultaneous with the bonding between the substrate and the insert and between the insert and the cellular surface, without incurring significant damage to one or more of the surface covering and the cellular layer.

14. The soft trim composite as defined in claim 1 wherein the thermoplastic substrate is created by molding of molten thermoplastic resin substantially simultaneous with the bonding between the substrate and the insert and between the insert and the cellular surface.

15. The soft trim composite as defined in claim 3 wherein the thermoplastic substrate is created by molding of molten thermoplastic resin substantially simultaneous with the bonding between the substrate and the insert and between the insert and the cellular surface.

16. The soft trim composite as defined in claim 7 wherein the thermoplastic substrate is created by molding of molten thermoplastic resin substantially simultaneous with the bonding between the substrate and the insert and between the insert and the cellular surface.

17. The soft trim composite as defined in claim 11 wherein the thermoplastic substrate is created by molding of molten thermoplastic resin substantially simultaneous with the bonding between the substrate and the insert and between the insert and the cellular surface.

* * * * *